(12) United States Patent
Greaves et al.

(10) Patent No.: US 6,591,312 B1
(45) Date of Patent: Jul. 8, 2003

(54) DIGITAL COMMUNICATION DEVICES AND DIGITAL COMMUNICATION METHODS

(75) Inventors: Warren J. Greaves, Boise, ID (US); Peter J. Macer, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/577,218

(22) Filed: May 23, 2000

(51) Int. Cl.[7] ................................................. G06F 3/00
(52) U.S. Cl. .......................... 710/14; 710/11; 710/105; 712/225
(58) Field of Search ...................... 710/1, 5, 7, 15, 710/20, 36, 62, 63, 73, 74, 11, 14, 29, 31, 105, 106; 712/225; 370/468

(56) References Cited

U.S. PATENT DOCUMENTS

| | | | | |
|---|---|---|---|---|
| 4,271,466 A | * | 6/1981 | Yamamoto et al. | 364/200 |
| 4,697,281 A | * | 9/1987 | O'Sullivan | 379/59 |
| 4,891,783 A | * | 1/1990 | Aritaka et al. | 364/900 |
| 4,922,534 A | * | 5/1990 | Gorniak et al. | 380/49 |
| 5,642,350 A | * | 6/1997 | Dailey | 370/439 |
| 6,088,366 A | * | 7/2000 | Sung | 370/468 |

OTHER PUBLICATIONS

U.S. patent application Ser. No. 09/059,867, filed Apr. 14, 1998.
U.S. patent application Ser. No. 09/059,909, filed Apr. 14, 1998.
Peter Kwan, "Amber Application Note", Dec. 2, 1996, pp. 1–44.
http://www.jetsend.hp.com/press/Whitepaper.html , pp 1–7, Mar. 22, 2000.

* cited by examiner

Primary Examiner—Jeffrey Gaffin
Assistant Examiner—Rijue Mai

(57) ABSTRACT

Digital communication devices and digital communication methods are provided. In one aspect of the invention, a digital communication device includes storage circuitry; communication circuitry coupled with the storage circuitry and configured to communicate digital data and a plurality of digital formats externally of the digital communication device; and processing circuitry coupled with the communication circuitry and configured to operate in a receive mode and a send mode, wherein in the receive mode the processing circuitry is configured to select one of the data formats and in the send mode the processing circuitry is configured to send data formats which correspond to digital data stored within the storage circuitry.

26 Claims, 2 Drawing Sheets

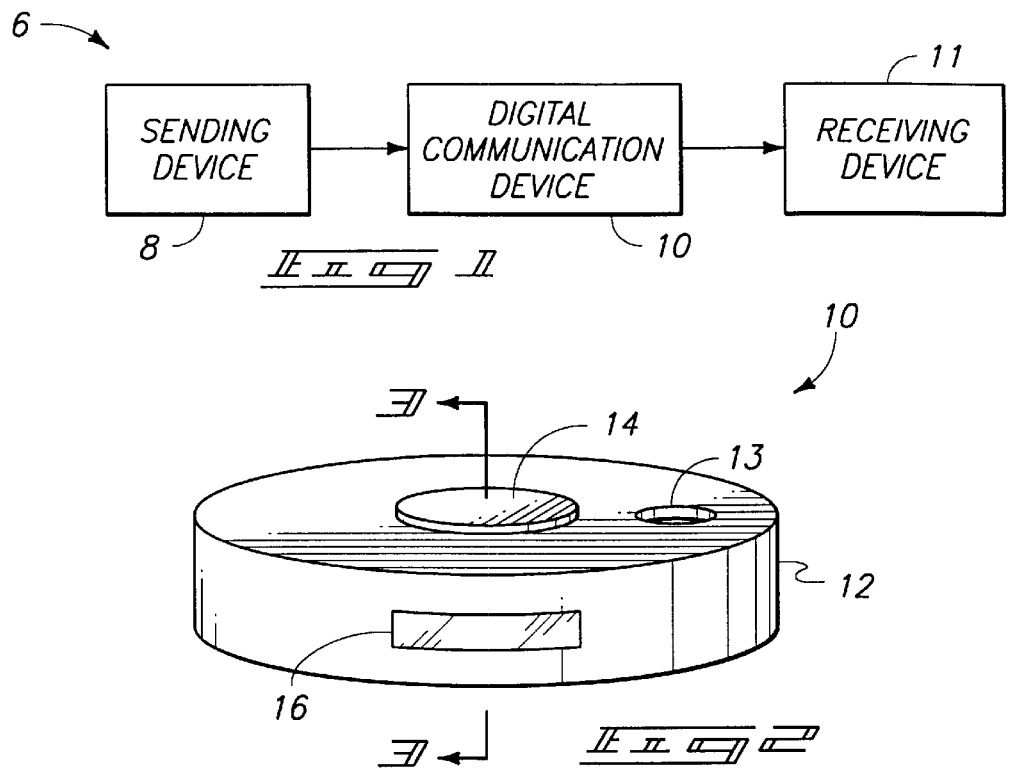
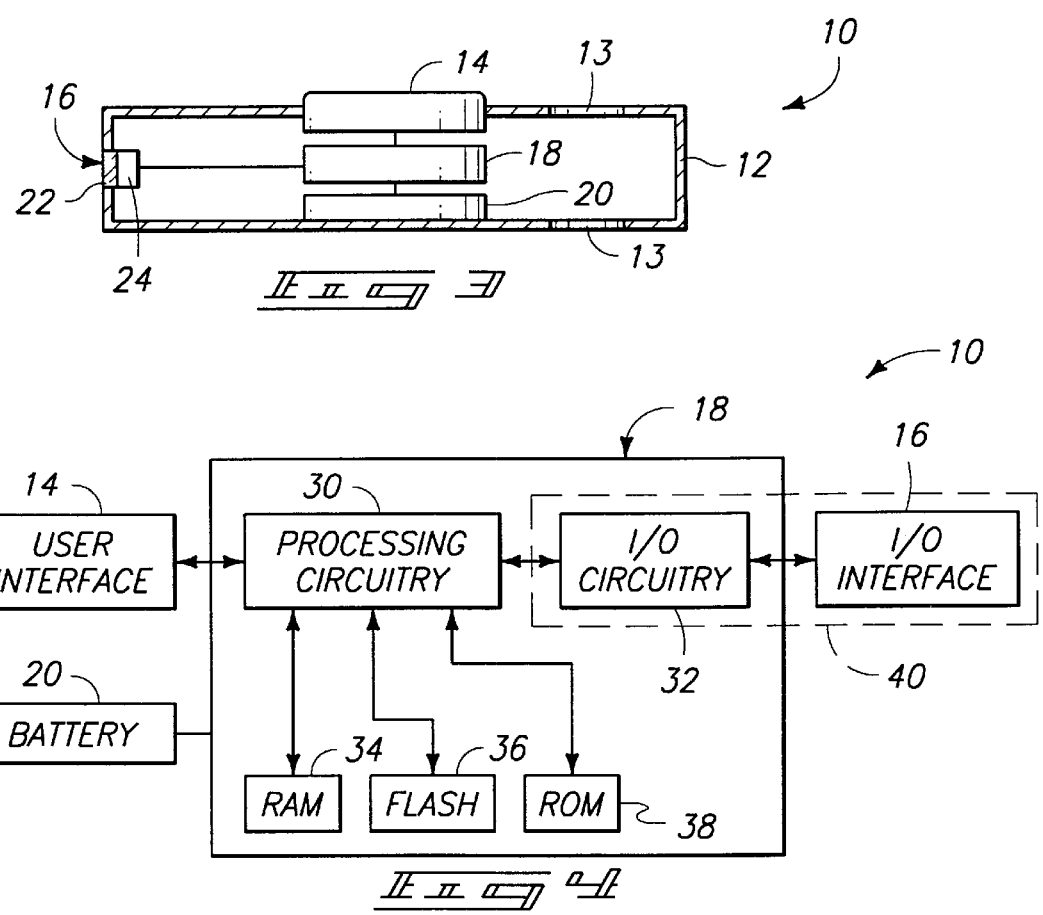

DIGITAL COMMUNICATION DEVICES AND DIGITAL COMMUNICATION METHODS

FIELD OF THE INVENTION

The present invention relates to digital communication devices and digital communication methods.

BACKGROUND OF THE INVENTION

The number of devices utilizing digital technology has been rapidly increasing as the speed of processors has increased, digital storage (i.e., memory) capacities have increased, etc. Distinct and dissimilar devices are now being configured to share digital data utilizing digital communications. Such flourishing of digital technology has lead to the development of communication protocols offering enhanced communications of digital information.

Communication protocols have been introduced to efficiently transfer digital information in a quick, simple, and accurate manner. One exemplary communication protocol is JetSend™ which intelligently negotiates the best possible communication route and format of communicated data to effect communications between connected devices. Such is accomplished over a connection such as a network or infrared communication medium, for example. JetSend™ communication protocol utilizes a JetSend™ enabled device to capture documents and to send them to another JetSend™ enabled device. An exemplary sending device may be an HP digital sender and a receiving device may be, for example, an HP Color LaserJet™ Printer. Further details of the JetSend™ communications protocol are described at www.jetend.hp.com, the teachings of which are incorporated herein by reference. Devices currently using JetSend™ communications include personal computers (PCs), laptops, personal digital assistants (PDAs), digital cameras, printers, facsimile devices, etc.

An exemplary compact communication device called the Amber reference kit is available from Avnet Electronics. This small communication device implements communications using infrared (IR) communications. Such communicates digital data in a raw PCL format via an IR interface. While offering benefits of portability and compact size, the communication device is limited to PCL communications.

SUMMARY OF THE INVENTION

The present invention relates to digital communication devices and digital communication methods.

In one aspect of the invention, a digital communication device comprises: storage circuitry; communication circuitry coupled with the storage circuitry and configured to communicate digital data and a plurality of digital formats externally of the digital communication device; and processing circuitry coupled with the communication circuitry and configured to operate in a receive mode and a send mode, wherein in the receive mode the processing circuitry is configured to select one of the data formats and in the send mode the processing circuitry is configured to send data formats which correspond to digital data stored within the storage circuitry.

In another aspect of the invention, a digital communication device comprises: storage circuitry; communication circuitry coupled with the storage circuitry and configured to communicate digital data and a plurality of digital formats externally of the digital communication device in accordance with the JetSend™ communication protocol; and processing circuitry coupled with the communication circuitry and configured to operate in a receive mode and a send mode, wherein in the receive mode the processing circuitry is configured to select one of the data formats and in the send mode the processing circuitry is configured to send data formats which correspond to digital data stored within the storage circuitry, wherein the processing circuitry is configured to initially operate in the receive mode to listen for reception of communication data using the communication circuitry, and to operate in the send mode responsive to a failure to receive communication data during the operation in the receive mode, and wherein the processing circuitry is configured to store digital data received via the communication circuitry within the storage circuitry during operation in the receive mode and to apply digital data from the storage circuitry to the communication circuitry during operation in the send mode.

Another aspect of the invention provides a digital communication method comprising: providing a communication device configured to communicate digital data externally of the communication device; operating the communication device in a receive mode including: receiving a plurality of data formats; selecting one of the data formats; receiving digital data within the selected one of the data formats; and storing the digital data; and operating the communication device in a send mode including: outputting a plurality of data formats which correspond to the stored digital data; and outputting the stored digital data.

Other features and advantages of the invention will become apparent to those of ordinary skill in the art upon review of the following detailed description, claims, and drawings.

DESCRIPTION OF THE DRAWINGS

FIG. 1 is a functional block diagram of an exemplary digital communication system.

FIG. 2 is an isometric view of an exemplary digital communication device of the digital communication system.

FIG. 3 is a cross-sectional view of the digital communication device shown in FIG. 2.

FIG. 4 is a functional block diagram of exemplary components of the digital communication device shown in FIG. 2.

DETAILED DESCRIPTION OF PREFERRED EMBODIMENTS

Figure 5:
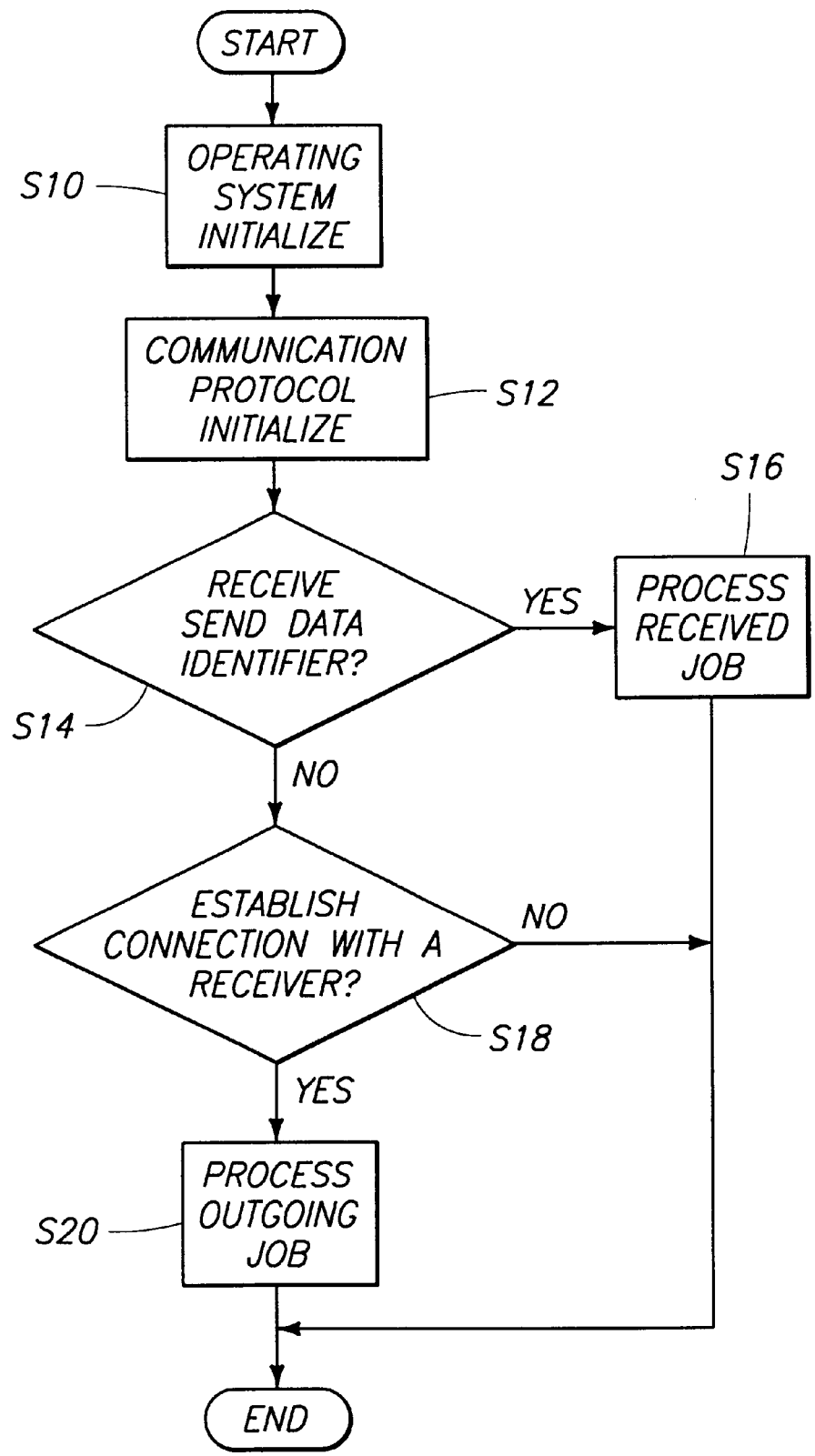
FIG. 5 is a flow chart of exemplary operations of the digital communication device.

Referring to FIG. 1, plural communication devices of an exemplary communication system 6 are shown. Communication system 6 includes a sending device 8, digital communication device 10 and a receiving device 11. Communications are implemented intermediate communication devices 8, 10, 11 using either wired or wireless connections. Exemplary wireless communications include radio frequency (RF) communications or infrared communications (IR). Exemplary wired communications may be effected using TCP/IP communications. Other communications are possible.

Communications intermediate communication devices 8, 10, 11 are implemented according to a common communication protocol in the described embodiment. For example, communication devices 8, 10, 11 communicate in accordance with the JetSend™ communication protocol in the described configuration although utilization of other communications protocols is possible. For example, such communications could be enhanced or changed to use RF technology, such as the Bluetooth communication standard.

Further details of the JetSend™ communication protocol are described at www.jetsend.hp.com/press/Whitepaper.html, the teachings of which are incorporated by reference. Additional details regarding JetSend™ communications are described in U.S. patent application Ser. No. 09/059,867, entitled Method and Apparatus for Device Interaction by Protocol, filed Apr. 14, 1998, naming Peter M. Williams and Patrick S. Arnold as inventors, and incorporated herein by reference, and U.S. patent application Ser. No. 09/059,909, entitled Method And Apparatus For Device Interaction by Format, filed Apr. 14, 1998, naming Peter M. Williams, Patrick S. Arnold, Frederik Willerup and Anthony Sowden as inventors, and incorporated herein by reference.

In general, HP JetSend™ is an information exchange protocol for fixed-function and programmable devices. It supports any-to-any communication between an open-ended set of device types. Communication in JetSend™ involves change in one device causing equivalent change in devices to which it is connected.

JetSend™ works by synchronizing connected devices, such as communication devices 8, 10, 11. JetSend™ devices communicate information that can be rendered perceptible to people (i.e. visible, audible, or tangible). The JetSend™ protocol packages and sends encodings of perceptible phenomena, and changes to perceptible phenomena. JetSend™ encodings comprising digital data such as graphical data, photograph data, textual data, or other data to be communicated are collectively referred to as e-material—which is short for "electronic material".

For example, sending device 8, such as a JetSend™ camera, might provide a digital photograph which is to be printed using receiving device 11, such as an HP color printer. Digital communication device 10 may be utilized to receive and store the electronic material, or e-material, such as graphical, text, photograph or other information for later downloading to the receiving device 11 for printing. The camera and printer are exemplary. Sending device 8 could comprise an HP CapShare 910, scanner, instrument, or PC, and the receiving device 11 could comprise a TV, projector, LaserJet printer or PDA. Other configurations of communication devices 8, 11 are possible. JetSend™ encodings are independent of the devices that generate and consume them—they describe what the image looks like, and not how it should be processed to provide appliance style communication.

JetSend™ distinguishes what is transmitted between devices from how it is encoded. JetSend™ devices negotiate and agree how they are going to achieve a particular exchange of digital data. Accordingly, JetSend™ enabled devices perform negotiations to exchange information. Exchanges potentially involve negotiation of: 1. the encoding itself; 2. parameters of the chosen encoding; and 3. how the information is to be transferred. Items 1–3 are referred to herein as data formats which are negotiated to communicate e-material.

For example, a JetSend™ sending device 8, such as a scanner, typically generates e-material comprising raster images. The scanner might be able to encode these in TIFF, JPEG, Group 4 Fax format, etc. Each encoding has variable parameters: numbers of pixels in each dimension; color depth; source device color profile; compression; quality; etc. A receiving device 11, such as a contone color printer, receiving an image from a scanner might choose a JPEG encoding with a number of pixels which exactly fill the printed page at desired printer resolution, and full color depth. A halftone printer receiving device 11 might request fewer pixels, and a color depth appropriate to its dithering algorithm. A TV receiving device 11 might request fewer pixels still, but the same or greater color depth. A monochrome printer receiving device 11 might ask for more pixels but no chrominance information at all (if the encoding allowed it).

Beneficial JetSend™ device configurations offer the largest number of encodings and parameters that other JetSend™ devices will accept, and vice versa. The JetSend™ recommendation includes intelligent default encodings and parameters, but offering or accepting as large a set of encodings and parameters as possible maximizes the chance of an optimal negotiation. JetSend™ negotiation involves a receiving device 10 or 11 making choices from a list of encodings and parameters offered by a sending device 8 or 10. This assumes that, because the receiving device receives and perhaps processes the information, it is in a better position to decide what it should receive. For example, with printers, which have to buffer page images before printing them, available memory affects the size of images the printer can accept. A sending device cannot determine this without a very detailed model of the internal state and workings of the printer. As discussed further below, digital communication device 10 operates in plural modes including a receive mode and a send mode wherein it operates as a respective receiving device and sending device as described above.

During communications within communication system 6, plural negotiations typically occur. For example, initially there is a negotiation of encodings and parameters intermediate sending device 8 and digital communication device 10. Thereafter, there may exist another negotiation intermediate digital communication device 10 and receiving device 11. Alternatively, only one negotiation within communication system 6 occurs between communication devices 8, 10, 11.

Referring to FIG. 2, an exemplary configuration of digital communication device 10 is shown. Digital communication device 10 is configured as a small, portable, handheld device in the described embodiment. The depicted digital communication device 10 is implemented with a coin-shaped housing 12. In one configuration, coin-shaped housing 12 has approximate dimensions of the U.S. nickel coin. For example, coin-shaped housing 12 can have a diameter of approximately two centimeters and a thickness of approximately 0.5 centimeters in such a configuration. The depicted housing 12 includes an aperture 13 permitting attachment thereof to a ring providing a key ring configuration. Such a housing 12 provides a portable device. Other housing arrangements are possible for digital communication device 10.

For example, device 10 is implemented within a credit card sized housing in an alternative arrangement. Internal components 14, 18, 20 are positioned side-by-side in some alternative configurations to provide housings 12 of reduced thicknesses (e.g. approximately 0.1 centimeters).

In the illustrated configuration, a user interface 14 is provided upon an upper surface of coin-shaped housing 12 and an input/output (I/O) interface 16 is provided within a side surface of digital communication device 10. Digital communication device 10 is operable to communicate using wireless signals (e.g., IR signals) through I/O interface 16 in one exemplary embodiment. Other embodiments of digital communication device 10 according to the present invention implement external communications using other media such as a wire connection or RF signals within air. Digital communication device 10 is configured to implement communications with sending device 8 and receiving device 11 using a common communication protocol. In the described configuration, digital communication device 10 implements communications in accordance with the JetSend™ communication protocol with sending device 8 and receiving device 11 individually also configured for JetSend™ communications.

Referring to FIG. 3, internal components of an exemplary configuration of communication device 10 are shown. The illustrated communication device includes user interface 14, I/O interface 16, an integrated circuit 18, and a battery 20. Battery 20 is provided within housing 12 in the illustrated configuration.

The configuration of communication device 10 shown in FIG. 3 operates to provide wireless communications externally of communication device 10. Such external wireless communications are implemented using I/O interface 16 in the described embodiment. The depicted I/O interface 16 is configured for optical wireless communications, such as infrared, and accordingly includes a lens 22 and optical circuitry 24. Exemplary optical circuitry 24 comprises a photo diode and a light emitting diode (LED), for example. Integrated circuit 18 can implement such wireless communications using optical circuitry 24 to pass and receive optical wireless signals through lens 22.

In other arrangements, digital communication device 10 implements wireless communications using radio frequency (RF) wireless communications. In such a configuration, I/O interface 16 may be implemented as an antenna configured for RF communications. Further alternatively, and as described above, I/O interface 16 may be arranged as a network interface card (NIC) to provide communications via a dedicated connection such as a wire.

Referring to FIG. 4, details of an exemplary integrated circuit 18 are shown. In such depicted embodiment, integrated circuit 18 includes processing circuitry 30, I/O circuitry 32, random access memory (RAM) 34, flash memory 36 and read only memory (ROM) 38. As shown, processing circuitry 30 is coupled with internal components including I/O circuitry 32, RAM 34, flash memory 36 and ROM 38. In addition, processing circuitry 30 is coupled with user interface 14. Battery 20 is coupled to provide power to appropriate components of integrated circuit 18 including processing circuitry 30. I/O circuitry 32 is additionally coupled with I/O interface 16. Collectively, I/O interface 16 and I/O circuitry 32 may be referred to as communication circuitry 40. Exemplary I/O circuitry 32 includes an IR transceiver, RF transceiver or circuitry to effect wired communications.

Processing circuitry 30 comprises a microprocessor in one arrangement configured to operate upon executable code. Such executable code may be implemented as software instructions or firmware instructions within ROM 38. Such executable code can include conversion instructions to enable processing circuitry 30 to convert data within a given format to another data format, JetSend™ protocol instructions configured to implement the JetSend™ communications protocol using communications circuitry 40, and standard operating system instructions to provide operations of digital communication device 10 including data storage, data retrieval, etc. Processing circuitry 30 has access to RAM 34 during execution of instructions including conversion instructions, JetSend™ communication protocol instructions, and operating system instructions.

Communications circuitry 40 is configured to communicate digital data and a plurality of data formats according to the desired communications protocol externally of Digital communication device 10. Communication circuitry 40 is coupled with storage circuitry comprising flash memory 36 in the depicted embodiment. Other storage circuitry configurations are possible. As described in detail further below, digital data received within communication device 10 may be stored in and retrieved from the storage circuitry.

Processing circuitry 30 is also coupled with communication circuitry 40 and is configured to operate Digital communication device 10 in a receive mode and a send mode as previously mentioned. Processing circuitry 30 is configured to store digital data received via communication circuitry 40 within flash memory 36 comprising storage circuitry during operation of digital communication device 10 in the receive mode. Processing circuitry 30 is additionally configured to retrieve digital data from flash memory 36 comprising such storage circuitry, and apply the retrieved data to communication circuitry 40 during operation in the send mode. Communication Circuitry 40 operates to receive digital data during the receive mode and outputs or transmits digital data during operation in the send mode. Such communication operations are implemented according to the desired communication protocol, such as JetSend™.

According to the JetSend™ communication protocol, data connections are established between the communication devices 8, 10, 11, data formats are negotiated between the communication devices 8, 10, 11 and the digital data is communicated according to the negotiated data formats. For example, an initiate operation command is utilized in one arrangement to begin communication operations of digital communication device 10. A user initiates operation of digital communication device 10 through manipulation of user interface 14 to send the initiate operation command. Alternatively, digital communication device 10 can receive an initiate operation from communication circuitry 40. Other configurations are possible.

User Interface 14 is coupled with processing circuitry 30. User Interface 14 applies signals such the initiate operation command to processing circuitry 30. Following receipt of the initiate operation command, processing circuitry 30 is configured to implement operations of Digital communication device 10 in at least one of the receive mode and send mode.

During receive mode operations, digital communication device 10 operates as a receiving device to communicate with sending device 8. Processing circuitry 30 selects one of the data formats received from sending device 8 external of digital communications device 10 during negotiation. For example, processing circuitry 30 may read through a list of communicated e-material and chooses a best data format (e.g., encodings and/or parameters) it can process. In the described configuration, digital communication device 10 may choose to receive e-material digital data in a highly compressed image format, for example, as storage space within the storage circuitry may be limited.

During send mode operations, digital communication device 10 operates as a sending device to communicate with receiving device 11. Processing circuitry is configured to send data formats which correspond to digital data stored within flash memory 36 comprising the storage circuitry. Processing circuitry 30 may negotiate during JetSend™ communication protocol operations by offering e-material in a plurality of data formats corresponding to the digital data stored within the storage circuitry, or it can otherwise render.

For example, in one configuration, conversion instructions are provided within ROM 38 as previously discussed to permit processing circuitry 30 to convert digital data stored within flash memory 36 from a given data format to another data format (e.g., convert digital data from the data format in which it was received as e-material from sending device 8 to a new negotiated data format to be sent as e-material to receiving device 11). Such conversion of digital data from one data format to another data format may be dependent upon a desire to further compress such stored digital data, be responsive to the subsequent negotiation process, or other reasons. Device 10 may offer possible conversion data formats to receiving device 11 which correspond to the conversion operations. If device 11 chooses one such format, device 10 converts the data to the chosen format and forwards the converted data to device 11.

In the preferred embodiment of the invention, digital communication device 10 is provided in a small, portable package such as the disclosed key ring configuration. With the aim of simplicity, processing circuitry 30 can determine whether to operate in the receive mode or the send mode. In the described embodiment, processing circuitry 30 initially operates in the receive mode and may selectively operate in the send mode. In one arrangement, processing circuitry 30 initially operates in the receive mode to listen using communication circuitry 40 for communication data which can comprise either communicated digital data (e.g., e-material graphical information, e-material photograph information, e-material text information, etc.) or data formats (e.g., encodings and parameters of the e-material) communicated from the sending device 8.

If processing circuitry 30 fails to detect the reception of any such communication data via communication circuitry 40 during the initial receive mode, processing circuitry 30 may after a predetermined timeout period operate in the send mode to communicate digital data such as e-material photograph information, e-material text material, etc. stored within flash memory 36.

Referring to FIG. 5, exemplary operations of processing circuitry 30 are described. Instructions configured to implement the depicted operations are stored as software or firmware within ROM 38 of FIG. 4 in the described arrangement.

The depicted methodology of FIG. 5 is typically executed following an initiating event, such as the reception of an initiate operation command from User Interface 14. Other initiation events are possible such as periodic entering of an awake mode from a sleep mode to determine whether communications are desired.

At step S10, an operating system initialization is performed to set initial variables and run diagnostic tests etc. within digital communication device 10. The operating system controls general data manipulation (e.g., storage and retrieval) and other internal operations within digital communication device 10.

At step S12, processing circuitry 30 performs any communication protocol initialization, such as setting data structures and variables for the communication protocol being utilized. Such comprises setting JetSend™ data structures and variables in the described arrangement.

Thereafter, processing circuitry 30 enters a receive mode of operation at step S14. At step S14, processing circuitry 30 monitors or listens for the reception of an identifier within any communication data received within communication Circuitry 40 from sending device 8.

If so, processing circuitry 30 proceeds to step S16 to perform any processing upon the received job. Such includes establishing a data connection and negotiating desired data formats according to the JetSend™ communication protocol in the described enlistment, reception of digital data (comprising the e-material in the disclosed embodiment), and storage of the digital data within flash memory 36.

Alternatively, processing circuitry 30 proceeds to step S18 to attempt to establish a data connection with a receiver such as receiving device 11 if the condition of step S14 is in the negative.

If such a data connection is established at Step S18, processing circuitry proceeds to step S20 to process an outgoing job according to the communication protocol, such as negotiating data formats and outputting e-material comprising the digital data retrieved from the storage circuitry in the JetSend™ described configuration.

Following execution of Steps S16, S20 or if the condition of step S18 is in the negative, processing circuitry 30 enters a halt condition including a sleep mode of operation to conserve power. Thereafter, the depicted methodology of FIG. 5 may be repeated.

The protection sought is not to be limited to the disclosed embodiments, which are given by way of example only, but instead is to be limited only by the scope of the appended claims.

What is claimed is:

1. A digital communication device comprising:
   storage circuitry;
   communication circuitry coupled with the storage circuitry and configured to communicate digital data and a plurality of data formats externally of the digital communication device; and
   processing circuitry coupled with the communication circuitry and configured to operate in a receive mode and a send mode, wherein in the receive mode the processing circuitry is configured to select one of the data formats and in the send mode the processing circuitry is configured to send data formats which correspond to digital data stored within the storage circuitry.

2. The device according to claim 1 further comprising a coin-shaped housing configured to contain the storage circuitry, the communication circuitry and the processing circuitry.

3. The device according to claim 2 further comprising a battery coupled with the processing circuitry and provided within the housing.

4. The device according to claim 1 wherein the processing circuitry is configured to operate in at least one of the receive mode and the send node responsive to an initiate operation command.

5. The device according to claim 1 wherein the processing circuitry is configured to initially operate in the receive mode and selectively operate in the send mode.

6. The device according to claim 1 wherein the processing circuitry is configured to initially operate in the receive mode to listen for reception of communication data using the communication circuitry, and to operate in the send mode responsive to a failure to receive communication data during the operation in the receive mode.

7. The device according to claim 1 wherein the communication circuitry is configured to communicate using wireless communication signals.

8. The device according to claim 1 wherein the processing circuitry is configured to selectively convert digital data stores within the storage circuitry from one data format to another data format.

9. The device according to claim 8 wherein the processing circuitry is configured to convert responsive to a negotiation with an external device.

10. The device according to claim 1 wherein the processing circuitry is configured to store digital data received via the communication circuitry within the storage circuitry during operation in the receive mode and to apply digital data from the storage circuitry to the communication circuitry during operation in the send mode.

11. The device according to claim 1 wherein the communication circuitry is configured to communicate digital data according to the JetSend™ communication protocol.

12. The device according to claim 1 wherein the digital communication device is configured to communicate with a first external device in the receive mode and Ho communicate with a second external device different than the first external device in the send mode.

13. The device according to claim 1 wherein the communication circuitry is configured to receive the data formats from an external device during the receive mode, and the processor is configured to select one of the data formats and to communicate the selection to the external device.

14. A digital communication device comprising:

storage circuitry;

communication circuitry coupled with the storage circuitry and configured to communicate digital data and a plurality of data formats externally of the digital communication device in accordance with the JetSend™ communication protocol; and processing circuitry coupled with the communication circuitry and configured to operate in a receive mode and a send mode, wherein in the receive mode the processing circuitry is configured to select one of the data formats and in the send mode the processing circuitry is configured to send data formats which correspond to digital data stored within the storage circuitry, wherein the processing circuitry is configured to initially operate in the receive mode to listen for reception of communication data using the communication circuitry, and to operate in the send mode responsive to a failure to receive communication data during the operation in the receive mode, and wherein the processing circuitry is configured to store digital data received via the communication circuitry within the storage circuitry during operation in the receive mode and to apply digital data from the storage circuitry to the communication circuitry during operation in the send mode.

15. A digital communication method comprising:

providing a communication device configured to communicate digital data externally of the communication device;

operating the communication device in a receive mode including:

receiving a plurality of data formats;

selecting one of the data formats;

receiving digital data within the selected one of the data formats; and storing the digital data; and operating the communication device in a send mode including:

outputting a plurality of data formats which correspond to the stored digital data; and outputting the stored digital data.

16. The method according to claim 15 wherein the providing comprises providing a communication device having a coin-shaped housing.

17. The method according to claim 15 wherein the providing comprises providing a communication device having a battery.

18. The method according to claim 15 further comprising receiving an initiate operation command, and wherein the operatings are responsive to the receiving the initiate operation command.

19. The method according to claim 15 wherein the operatings comprise initially operating in the receive mode and selectively operating in the send mode.

20. The method according to claim 15 wherein the operatings comprise initially operating in the receive mode comprising listening for communication data, and operating in the send mode responsive to a failure to receive communication data during the listening.

21. The method according to claim 15 wherein the receiving and the outputting comprise receiving and outputting using wireless communication signals.

22. The method according to claim 15 further comprising converting digital data from one format to another format.

23. The method according to claim 22 wherein the operating the communication device in the send mode includes receiving a data format selection responsive to the outputting the date formats, and the converting is responsive to the receiving.

24. The method according to claim 15 wherein the operatings individually comprise operating the communication device according to the JetSend™ communication protocol.

25. The method according to claim 15 wherein the operating the communication device in the receive mode comprises communicating with a first external device and the operating the communication device in the send mode comprises communicating with a second external device different than the first external device.

26. The method according to claim 15 wherein the operating the communication device in the receive mode includes communicating the selection to an external device, and the receiving the digital data comprises receiving responsive to the communicating.

* * * * *

UNITED STATES PATENT AND TRADEMARK OFFICE
CERTIFICATE OF CORRECTION

PATENT NO. : 6,591,312 B1
DATED : July 8, 2003
INVENTOR(S) : Warren J. Greaves et al.

It is certified that error appears in the above-identified patent and that said Letters Patent is hereby corrected as shown below:

Column 9,
Line 15, delete "Ho" and insert therefor -- to --

Signed and Sealed this

Second Day of August, 2005

JON W. DUDAS
*Director of the United States Patent and Trademark Office*